April 4, 1967 H. PORIS 3,312,366
MEASURING DEVICE AND COVER
Filed Aug. 17, 1965
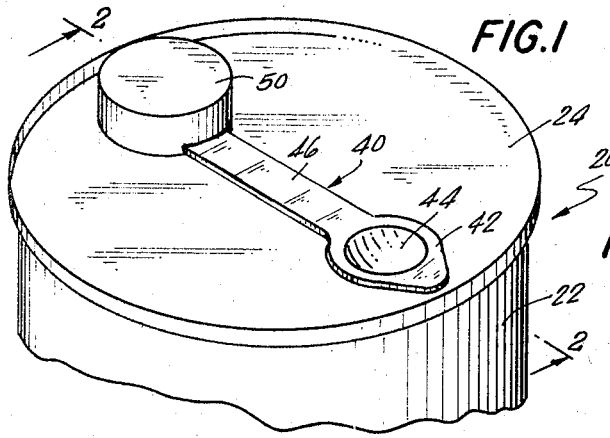
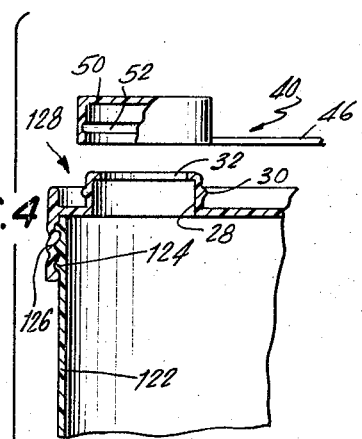
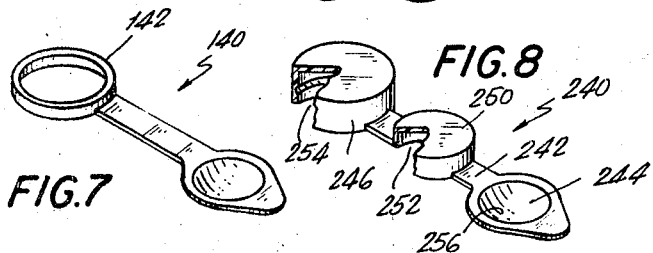
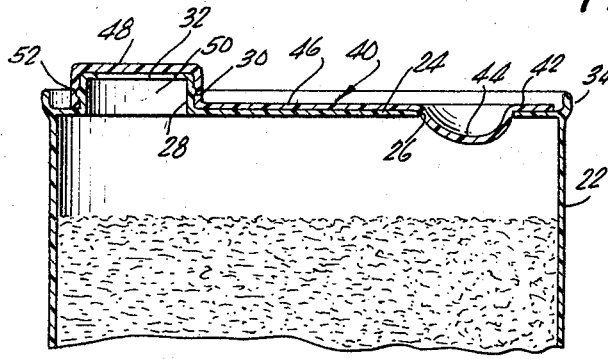
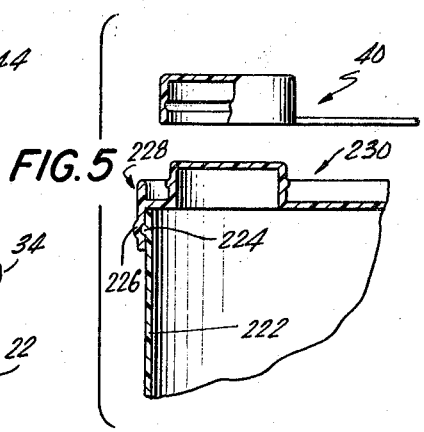
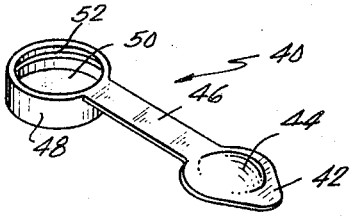
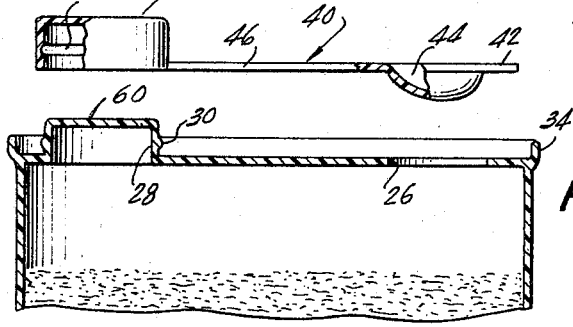
INVENTOR.
HARRY PORIS
BY
Briskin & Goldfarb
ATTORNEYS United States Patent Office 3,312,366
Patented Apr. 4, 1967

3,312,366
MEASURING DEVICE AND COVER
Harry Poris, 165 W. 66th St., New York, N.Y. 10023
Filed Aug. 17, 1965, Ser. No. 480,341
4 Claims. (Cl. 220—23)

This invention relates to a combined measuring device and cover for use with various types of containers for granular materials, powder, and/or liquid materials, such as foodstuffs, soaps, detergents, cosmetics, chemicals, and the like, and is especially adapted for use alternatively as a closure for a container and for measuring specific amounts of materials.

An object of the present invention is to provide a relatively inexpensive combined measuring device and cover for various types of containers that is simple to manufacture, attractive in appearance, easy to use, and very inexpensive to produce, thereby permitting wide use and distribution.

A further object of the invention resides in the provision of a simple combined measuring device and cover that will serve as a captive closure device yet which may be removed for use in measuring the contents of the container with which the device is employed.

Another object of the invention resides in the provision of a combined measuring device and cover, which may be made for detachable connection through threaded means or snap fastener means, or other types of fastening means to any type of container of desired size.

Still another object of the invention resides in the provision of a combined measuring device and cover that may be integrally blow molded or otherwise formed with a container.

A yet further object of the present invention resides in the provision of a combined measuring device and cover that may have one, two, three, or even more means for measuring predetermined and/or different amounts of material integrally formed therewith.

These, together with the various ancillary objects and features of the invention, which will become apparent as the following description proceeds, are attained by this combined measuring device and cover, preferred embodiments of which have been illustrated in the accompanying drawings, by way of example only, wherein:

FIG. 1 is a perspective view of an embodiment of the invention in accordance with the concepts of the present invention;

FIG. 2 is a vertical sectional view taken along the plane of line 2—2 in FIG. 1;

FIG. 3 is an exploded sectional view illustrating the modified embodiments of the invention shown in FIG. 2;

FIG. 4 is an exploded partial sectional view of a modified arrangement of the invention;

FIG. 5 is a sectional detail view of a further modification employing other means for securing the cover to the container;

FIG. 6 is a perspective view of one form of closure member;

FIG. 7 is a perspective view of another embodiment of the closure member; and,

FIG. 8 is a perspective view, with parts broken away, of still another embodiment of the closure member.

With continuing reference to the accompanying drawing, wherein like reference numerals designate similar parts throughout the various views, reference numeral 20 generally designates an embodiment of the invention which includes a container 22 formed of a synthetic plastic material such as polyvinyl chloride, polyethylene, polystyrene, polyurethane or the like, or which may be formed of metal or any other suitable material, and having a top 24.

In the embodiment shown in FIGS. 1 through 3, the top 24 is integrally formed as part of the container 22, both being blow molded out of a suitable synthetic plastic material. The top 24 is provided with an opening 26 therein and has a post 28 integrally formed therewith. The post is cylindrical in shape and is provided with a rib 30 which extends circumferentially therearound. The post 28 is also provided with an opening 32 therethrough. The top may be provided with a peripheral flange 34 as may be desired.

A closure member generally indicated by reference numeral 40 is adapted to be secured in a detachable manner to the post 28 so as to serve as a captive closure. The closure member 40 is generally in the form of a spoon having a spoon-shaped downwardly-extending projecting free end portion 42 provided with a recess 44 therein which recess is adapted to fit snugly within the opening 26 to close the opening. The closure member 40 includes a shank portion 46 and an integrally formed cap portion 48 which has a recess opening downwardly as at 50, see FIG. 6, for receiving the post 28 thereby closing the opening 32.

The cap is provided with a peripheral groove 52 therein, into which the rib 30 may be snap fitted so that the closure member may be rotated with respect to the post 28 yet is a captive on the post until purposefully removed so that the closure member may then be used as a measuring device. It is noted that the recess 44 is of a different size than the recess 50, thereby enabling the measuring of two different amounts of material. For example, the recess 44 may accommodate a conventional teaspoon, while the recess 50 may accommodate a conventional tablespoon.

Referring now to the embodiment as shown in FIG. 3, it will be noted that herein the post 28 has an imperforate upper portion 60, this being the only difference between the embodiment as shown in FIG. 3 and the embodiment as shown in FIG. 2.

In the embodiment shown in FIG. 4, in lieu of integrally molding the container with the cover, the container 122 is provided with threads 124 to which a threaded flange portion 126 of a cover generally designated by reference numeral 128 is secured. In this form, the closure member 40 may be identical with the embodiment of FIG. 1.

In the embodiment shown in FIG. 5, in lieu of the threaded arrangement for the container 222, there is provided a rib 224 for receiving a flange 226 thereover, which flange 226 has a groove 228 therein. The lid 230 is snap fitted over the rib 224 with the rib 224 seated in the groove 228. The closure member 40 may be utilized or in lieu thereof a closure member such as generally indicated at 140, see FIG. 7, or 240, see FIG. 8, may be employed. The closure member as shown in FIG. 7 may be provided with a ring 142 in lieu of the cap 48.

In the embodiment as shown in FIG. 8, the closure member 240 may include a shank 242, a spoon-shaped closure member 244, a cap 246, similar to the cap 48, and in addition a contents-measuring member 250, having a recess 252 therein of a different size than the recesses 254 and 256 thereby permitting three different predetermined amounts of materials to be measured by this measuring device.

It is important to note that this combined cover and measuring device has special adaptations to foodstuffs, chemicals, soaps, detergents, cosmetics, and the like for measuring a predetermined amount of material to be utilized while also providing the functions of a captive closure device. It may be molded out of various available synethic plastic materials, or made of metal or the like, as may be desired.

A latitude of modification, substitution and change is intended in the foregoing specification, and in some instances, some features of the invention will be employed without a corresponding use of other features. Accordingly, it is appropriate that the appended claims be construed boardly and in a manner consistent with the spirit and scope of the invention herein.

I claim:
1. A combined measuring device and cover comprising a top for a container, said top having openings therein, a post integrally formed on said top, said post having an opening therein, a closure member having a cap portion removably rotatably mounted on said post, said closure member including a shank portion having a free end, said free end being provided with a downwardly-extending spoon-shaped projection extending into said opening for sealing said opening, said projection being upwardly concave forming a first recess of predetermined size for measuring materials disposed therein, said cap portion having a second recess of a different predetermined size from said first recess.

2. A device according to claim 1, wherein said cap is provided with a groove therein, said post having a circumferential rib thereon, said rib being received in said groove so that said closure is captive.

3. A device according to claim 1, wherein said shank is provided with an integral contents-measuring receptacle having a third recess therein of a different size from said first and second recesses.

4. A device according to claim 1, wherein said top is provided with means for detachably securing said top to a container.

References Cited by the Examiner
UNITED STATES PATENTS 2,921,707  1/1960  Sloan _____ 220—23
3,106,311  10/1963  Fairchild _____ 220—38.5

THERON E. CONDON, *Primary Examiner.*

J. B. MARBERT, *Assistant Examiner.*